(12) United States Patent
Torsner et al.

(10) Patent No.: US 8,995,383 B2
(45) Date of Patent: *Mar. 31, 2015

(54) (H)ARQ FOR SEMI-PERSISTENT SCHEDULING

(71) Applicant: Telefonaktiebolaget LM Ericsson (Publ), Stockholm (SE)

(72) Inventors: Johan Torsner, Masaby (FI); Henning Wiemann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/039,061

(22) Filed: Sep. 27, 2013

(65) Prior Publication Data

US 2014/0023027 A1    Jan. 23, 2014

Related U.S. Application Data

(63) Continuation of application No. 12/530,988, filed as application No. PCT/SE2008/050278 on Mar. 13, 2008, now Pat. No. 8,594,029.

(30) Foreign Application Priority Data

Mar. 19, 2007 (SE) ...................................... 0700703

(51) Int. Cl.
*H04W 4/00* (2009.01)
*H04J 3/00* (2006.01)
(Continued)

(52) U.S. Cl.
CPC ............ *H04L 1/1861* (2013.01); *H04L 1/1822* (2013.01); *H04L 1/1887* (2013.01); *H04L 1/1896* (2013.01); *H04W 72/04* (2013.01); *H04W 72/042* (2013.01)

USPC .......................................... 370/329; 370/345

(58) Field of Classification Search
None
See application file for complete search history.

(56) References Cited

U.S. PATENT DOCUMENTS

| 2007/0189235 A1* | 8/2007 | Chandra et al. ................ 370/335 |
| 2008/0117891 A1* | 5/2008 | Damnjanovic et al. ........ 370/345 |
| 2010/0085927 A1 | 4/2010 | Torsner et al. |

FOREIGN PATENT DOCUMENTS

| EP | 2 023 523 A2 | 2/2009 |
| WO | 2008/115134 | 9/2008 |
| WO | 2009/053930 A2 | 4/2009 |

OTHER PUBLICATIONS

Damnjanovic et al.; Provisional U.S. Appl. No. 60/839,466, Aug. 22, 2006.

(Continued)

*Primary Examiner* — Afshawn Towfighi
(74) *Attorney, Agent, or Firm* — Nixon & Vanderhye P.C.

(57) ABSTRACT

A radio communications link is established between radio stations, and a semi-persistent radio resource is allocated to support data transmission over the communications link. The semi-persistent radio resource is associated with a corresponding automatic repeat request (ARQ) process identifier. Non-limiting examples of a semi-persistent radio resource include a regularly scheduled transmission time interval, frame, subframe, or time slot during which to transmit a data unit over the radio interface. Retransmission is requested of a data unit transmitted using the semi-persistent radio resource. The ARQ process identifier associated with the semi-persistent resource is used to match a retransmission of a data unit dynamically scheduled on the communications link with the requested data unit retransmission. In a preferred example embodiment, the ARQ process identifier is a hybrid ARQ (HARQ) process, where a retransmitted data unit is combined with a previously-received version of the data unit.

29 Claims, 8 Drawing Sheets

(51) Int. Cl.
*H04L 1/18* (2006.01)
*H04W 72/04* (2009.01)

(56) References Cited

OTHER PUBLICATIONS

English translation of Chinese Official Action dated Oct. 19, 2012, in Chinese Application No. 200880008934.2.
International Search Report for PCT/SE2008/050278, mailed Sep. 3, 2008.
International Preliminary Report on Patentability and Written Opinion mailed Sep. 22, 2009 in corresponding PCT Application PCT/SE2008/050278.
European Communication dated Jul. 20, 2012, in European Application No. 08 724 225.1.
L G Electronics Inc: "Re-Transmission of Persistent Scheduling", 3GPP Draft; R2-080389, 3rd Generation Partnership Project (3GPP), vol. RAN WG2, no. Sevilla, Spain, Jan. 8, 2008.
"Uplink Scheduling for VoIP", R2-070476, 3GPP TSG-RAN WG2 Meeting #57, Feb. 12-17, 2007, St. Louis, Missouri, USA.
"Alternative Uplink Synchronous HARQ Schemes", R1-062573, 3GPP TSG RAN WG1 #46-bis, Oct. 9-13, 2006, pp. 1-4.
"HARQ Process ID's for DL Persistent Scheduling", R2-075153, 3GPP TSG RAN WG2 #60, Nov. 5-9, 2007, Jeju, South Korea.
"Process ID Allocation for Downlink Persistent Scheduling", R2-080719, 3GPP TSG RAN WG2 #61, Feb. 11-15, 2008, Sorrento, Italy, pp. 1-5.
EPO Communication in related EP Application No. 08724225.1 dated Aug. 30, 2011.
Response to EPO Communication in related EP Application No. 08724225.1 dated Mar. 23, 2012.
Chinese Office Action in related CN Application No. 200880008934.2, dated Apr. 26, 2012.
English translation of CN Office Action in related CN Application No. 200880008934.2 dated Apr. 26, 2012.
Nokia: "Downlink Scheduling for VoIP", 3GPP Discussion and Decision; R2-070475 VOIP DL, 3rd Generation Partnership Project (3GPP), Feb. 12-16, 2007.
Nokia: "Uplink Scheduling for VoIP", 3GPP Discussion and Decision; R2-070476 VOIP UL, 3rd Generation Partnership Project (3GPP), Feb. 12-16, 2007.
Ericsson: "Comparison of scheduling methods for LTE" R2-070796; TSG-RAN WG2 Meeting #57, Feb. 12-16, 2007.
Ericsson: "Semi persistent scheduling" R2-062859; TSG-RAN WG2 Meeting #55, Oct. 9-13, 2006.

* cited by examiner

(H)ARQ FOR SEMI-PERSISTENT SCHEDULING

CROSS-REFERENCE TO RELATED APPLICATIONS

This application is a continuation of U.S. patent application Ser. No. 12/530,988, filed Sep. 11, 2009, allowed, which is the U.S. National Phase of International Application No. PCT/SE2008/050278, filed 13 Mar. 2008, which designated the U.S. and claims priority to Swedish Application No. 0700703-2 filed Mar. 19, 2007, the entire contents of each of which are hereby incorporated by reference.

TECHNICAL FIELD

The technical field relates to a mobile radio communications system and to such systems where semi-persistent scheduling is employed.

BACKGROUND

Universal Mobile Telecommunications System (UMTS) is an example of a mobile radio communications system. UMTS is a 3rd Generation (3G) mobile communication system employing Wideband Code Division Multiple Access (WCDMA) technology standardized within the $3^{rd}$ Generation Partnership Project (3GPP). In the 3GPP release 99, the radio network controller (RNC) in the radio access network controls radio resources and user mobility. Resource control includes admission control, congestion control, and channel switching which corresponds to changing the data rate of a connection. Base stations, called node Bs (NBs), which are connected to an RNC, orchestrate radio communications with mobile radio stations over an air interface. RNCs are also connected to nodes in a core network, i.e., Serving GPRS Support Node (SGSN), Gateway GPRS Support Node (GGSN), mobile switching center (MSC), etc. Core network nodes provide various services to mobile radio users who are connected by the radio access network such as authentication, call routing, charging, service invocation, and access to other networks like the Internet, public switched telephone network (PSTN), Integrated Services Digital Network (ISDN), etc.

The Long Term Evolution (LTE) of UMTS is under development by the 3rd Generation Partnership Project (3GPP) which standardizes UMTS. There are many technical specifications hosted at the 3GPP website relating to Evolved Universal Terrestrial Radio Access (E-UTRA) and Evolved Universal Terrestrial Radio Access Network (E-UTRAN), e.g., 3GPP TS 36.300. The objective of the LTE standardization work is to develop a framework for the evolution of the 3GPP radio-access technology towards a high-data-rate, low-latency and packet-optimized radio-access technology. In particular, LTE aims to support services provided from the packet switched (PS)-domain. A key goal of the 3GPP LTE technology is to enable high-speed packet communications at or above about 100 Mbps.

FIG. 1 illustrates an example of an LTE type mobile communications system 10. An E-UTRAN 12 includes E-UTRAN NodeBs (eNBs) 18 that provide E-UTRA user plane and control plane protocol terminations towards the user equipment (UE) terminals 20 over a radio interface. An eNB is sometimes more generally referred to as a base station, and a UE is sometimes referred to as a mobile radio terminal or a mobile station. As shown in FIG. 1, the base stations are interconnected with each other by an X2 interface. The base stations are also connected by an S1 interface to an Evolved Packet Core (EPC) 14 which includes a Mobility Management Entity (MME) and to a System Architecture Evolution (SAE) Gateway. The MME/SAE Gateway is shown as a single node 22 in this example and is analogous in many ways to an SGSN/GGSN gateway in UMTS and in GSM/EDGE. The S1 interface supports a many-to-many relation between MMEs/SAE Gateways and eNBs. The E-UTRAN 12 and EPC 14 together form a Public Land Mobile Network (PLMN). The MMEs/SAE Gateways 22 are connected to directly or indirectly to the Internet 16 and to other networks.

To provide efficient resource usage, LTE and other systems that used shared radio resources support fast "dynamic" scheduling where resources on the shared channels, e.g., in LTE this includes the physical downlink shared channel (PDSCH) and the physical uplink shared channel (PUSCH), are assigned dynamically to user equipment (UE) terminals and radio bearers on a sub-frame basis according to the momentary traffic demand, quality of service (QoS) requirements, and estimated channel quality. This assignment or scheduling task is typically performed by one or more schedulers situated in the eNB.

The overall scheduling concept for the downlink is illustrated in FIG. 2. To support fast channel-dependent link adaptation and fast channel-dependent time and frequency domain scheduling, the UE 20 may be configured to report the Channel Quality Indicator (CQI) to aid the eNB 18 in its dynamic scheduling decisions. Typically, the UE 18 bases the CQI reports on measurements on downlink (DL) reference signals. Based on the CQI reports and QoS requirements of the different logical channels, the DL scheduler in the eNB 18 dynamically assigns time and frequency radio resources, i.e., scheduling blocks. The dynamically-scheduled radio resource assignment is signaled on the Physical Downlink Control Channel (PDCCH) in the LTE example. Each UE 20 monitors the control channel to determine if that UE is scheduled on the shared channel (PDSCH in LTE), and if so, what physical layer radio resources to find the data scheduled for downlink transmission.

The uplink scheduling concept is illustrated in FIG. 3. The UE 20 informs the UL scheduler in the eNB 18 when data arrives in the transmit buffer with a Scheduling Request (SR). The UL scheduler selects the time/frequency radio resources the UE will use and also selects the transport block size, modulation, and coding because link adaptation for the uplink is performed in the eNB. The selected transport format is signaled together with information on the user ID to the UE. This means that the UE must use a certain transport format and that the eNB is already aware of the transmission parameters when detecting the UL data transmission from that UE. The assigned radio resources and transmission parameters are sent to the UE via the PDCCH in LTE. Later, additional Scheduling Information (SI) such as a Buffer Status Report (BSR) or a power headroom report may be transmitted together with data.

Although dynamic scheduling is the baseline for LTE and other systems, it can be less than optimum for certain types of services. For example, for services such as speech (VoIP) where small packets are generated regularly, dynamic scheduling results in substantial control signaling demands because a radio resource assignment needs to be signaled in each scheduling instance, which in the case of VoIP, an assignment must be signaled for every VoIP packet. To avoid this high relative signaling overhead for these types of services, resources may be assigned semi-statically, which is called "semi-persistent" or "persistent" scheduling. A semi-persistent assignment is only signaled once and is then available for the UE at regular periodic intervals without further assignment signaling.

Many modern wireless communications systems use a hybrid ARQ (HARQ) protocol with multiple stop-and-wait HARQ "processes". The motivation for using multiple processes is to allow continuous transmission, which cannot be achieved with a single stop-and-wait protocol, while at the same time having some of the simplicity of a stop-and-wait protocol. Each HARQ process corresponds to one stop-and-wait protocol. By using a sufficient number of parallel HARQ processes, a continuous transmission may be achieved.

FIG. 4 shows an eNB 18 with an HARQ controller 22 that includes multiple HARQ entities 1, 2, . . . , m (24), with each HARQ entity managing HARQ processes for a corresponding active UE 1, 2, . . . , n (20). FIG. 5 shows each HARQ entity 24 managing one or more HARQ processes A, B, . . . , n (26). One way of looking at the HARQ process is to view it as a buffer. Each time a new transmission is made in an HARQ process, that buffer is cleared, and the transmitted data unit is stored in the buffer. For each retransmission of that same data unit, the received retransmitted data unit is soft-combined with the data already in the buffer.

FIG. 6 illustrates an example of the HARQ protocol where P(X,Y) refers to the Yth transmission in HARQ process X. The example assumes six HARQ processes. If a large number of higher layer packets (e.g. IP packets) are to be transmitted, for each transmission time interval (TTI), the RLC and MAC protocol layers perform segmentation and/or concatenation of a number of packets such that the payload fits the amount of data that can be transmitted in a given TTI. The example assumes for simplicity that one IP packet fits into a TTI when RLC and MAC headers have been added so that there is no segmentation or concatenation.

Packets 1 through 6 can be transmitted in the first six TTIs in HARQ processes 1 through 6. After that time, HARQ feedback for HARQ process 1 is received in the receiver. In this example, a negative acknowledgment (NACK) for HARQ process 1 is received, and a retransmission is performed in HARQ process 1 (denoted P1,2). If a positive acknowledgment (ACK) had been received, a new transmission could have started carrying packet 7. If all 6 first transmissions failed (i.e., only NACKs are received), then no new data can be transmitted because all HARQ processes are occupied with retransmissions. Once an ACK is received for an HARQ process, new data can be transmitted in that HARQ process. If only ACKs are received (no transmission errors), then the transmitter can continuously transmit new packets.

In modern cellular systems, synchronous HARQ may be used for the uplink and asynchronous HARQ for the downlink. For that case, in the uplink, the subframe or transmission time interval (TTI) when the retransmission occurs is known at the base station receiver, while for the downlink, the base station scheduler has the freedom to choose the subframe or TTI for the retransmission dynamically. For both uplink and downlink, a single-bit HARQ feedback (ACK/NACK) is sent providing feedback about the success of the previous data unit transmission.

A problem created by introducing semi-persistent scheduling, as is currently proposed for LTE for example, is that a receiving UE cannot match-up a dynamically-scheduled retransmission of a HARQ process with the initially-transmitted HARQ process that was semi-persistently scheduled. If HARQ is operated in asynchronous mode, as is currently proposed for example in the LTE downlink, the problem is how the HARQ processes should be selected for semi-persistent scheduling. After a semi-persistent assignment, both the HARQ transmitter entity as well as the HARQ receiver entity would, for example, randomly pick an idle HARQ process with potentially different HARQ process IDs. The reason is that the eNB does not send an explicit assignment referring to a particular HARQ process ID. If the HARQ receiver can decode the information, it delivers the information to higher layers and acknowledges the reception. But if decoding fails, tehn the HARQ receiver sends a negative acknowledgement, and the HARQ transmitter issues a retransmission of that HARQ process. If the retransmission is scheduled dynamically (as in the LTE downlink), then the corresponding dynamic assignment must contain the identifier of the HARQ process. It is likely that the HARQ transmitter chose a HARQ process ID for the initial transmission that was different from the HARQ process ID selected by the HARQ receiver. Consequently, the HARQ receiver cannot match the dynamically retransmitted HARQ process unambiguously to a pending HARQ process. In fact, there may be multiple pending processes (persistently or dynamically scheduled) for which the receiver may not even have received the assignment. If different HARQ processes are used by the transmitter and the receiver, then the data may be erroneously soft-combined with other data and the transmitted can not correctly identify the HARQ ACK/NACK sent for the data. The failure to make this match thus significantly increases error rate and decreases throughput.

SUMMARY

Data units are communicated between radio stations over a radio interface. A radio communications link is established between the radio stations, and a semi-persistent radio resource is allocated to support data transmission over the communications link. The semi-persistent radio resource is associated with a corresponding automatic repeat request (ARQ) process identifier. Non-limiting examples of a semi-persistent radio resource include a regularly scheduled transmission time interval, frame, subframe, or time slot during which to transmit a data unit over the radio interface using an assigned radio resource in the frequency or code domain. Retransmission is requested of a data unit transmitted using the semi-persistent radio resource. The ARQ process identifier associated with the semi-persistent resource is used to match a retransmission of a data unit dynamically scheduled on the communications link with the requested data unit retransmission. In a preferred example embodiment, the ARQ identifier is a hybrid ARQ (HARQ) identifier, where a retransmitted data unit is combined with a previously-received version of the data unit, and where the HARQ identifier is associated with a HARQ process.

In one non-limiting example embodiment, the semi-persistent radio resource may be associated with multiple corresponding automatic repeat request (ARQ) process identifiers.

The association between the semi-persistent radio resource and the corresponding automatic repeat request (ARQ) process identifier may be communicated in a number of ways. One example is using a configuration message, and another is using a scheduling assignment message.

The technology in this application finds particularly advantageous application to communications between a base station and a user equipment (UE). For example, a base station includes a resource manager that allocates a semi-persistent radio resource for the radio connection, transmitting circuitry for transmitting data units to the UE using the semi-persistent radio resource, receiving circuitry to receive a request from the UE to retransmit one of the data units transmitted using the semi-persistent radio resource, and a processor that facilitates retransmission of the one data unit using a radio resource, (different from the semi-persistent radio resource), that is dynamically scheduled by the resource manager. The resource manager associates the semi-persistent radio resource with a corresponding hybrid automatic repeat request (HARQ) identifier and provides that association to the UE so as to permit the UE to use the HARQ identifier to determine an identity of retransmitted data unit. In one example embodiment, the HARQ identifier is a HARQ process identifier.

The user equipment (UE) includes receiving circuitry for receiving from the base station information indicating that a semi-persistent radio resource is allocated to support data transmission from the base station over the radio connection. Thereafter, the UE receives data units transmitted using the semi-persistent radio resource. The UE also receives from the base station an association between the semi-persistent radio resource and a corresponding hybrid automatic repeat request (HARQ) process. Preferably, the UE stores that association. The UE stores information received in the semi-persistent radio resource in the HARQ process associated with that resource. A transmitter sends a message to the base station requesting retransmission of the data unit associated with the HARQ process and previously transmitted using the semi-permanent radio resource if it detects a transmission error. Processing circuitry, e.g., in the UE, associates a received retransmission of a data unit dynamically scheduled on the radio connection with the corresponding pending HARQ process based on the HARQ process ID signaled in the dynamic resource allocation.

DETAILED DESCRIPTION

Figure 1:
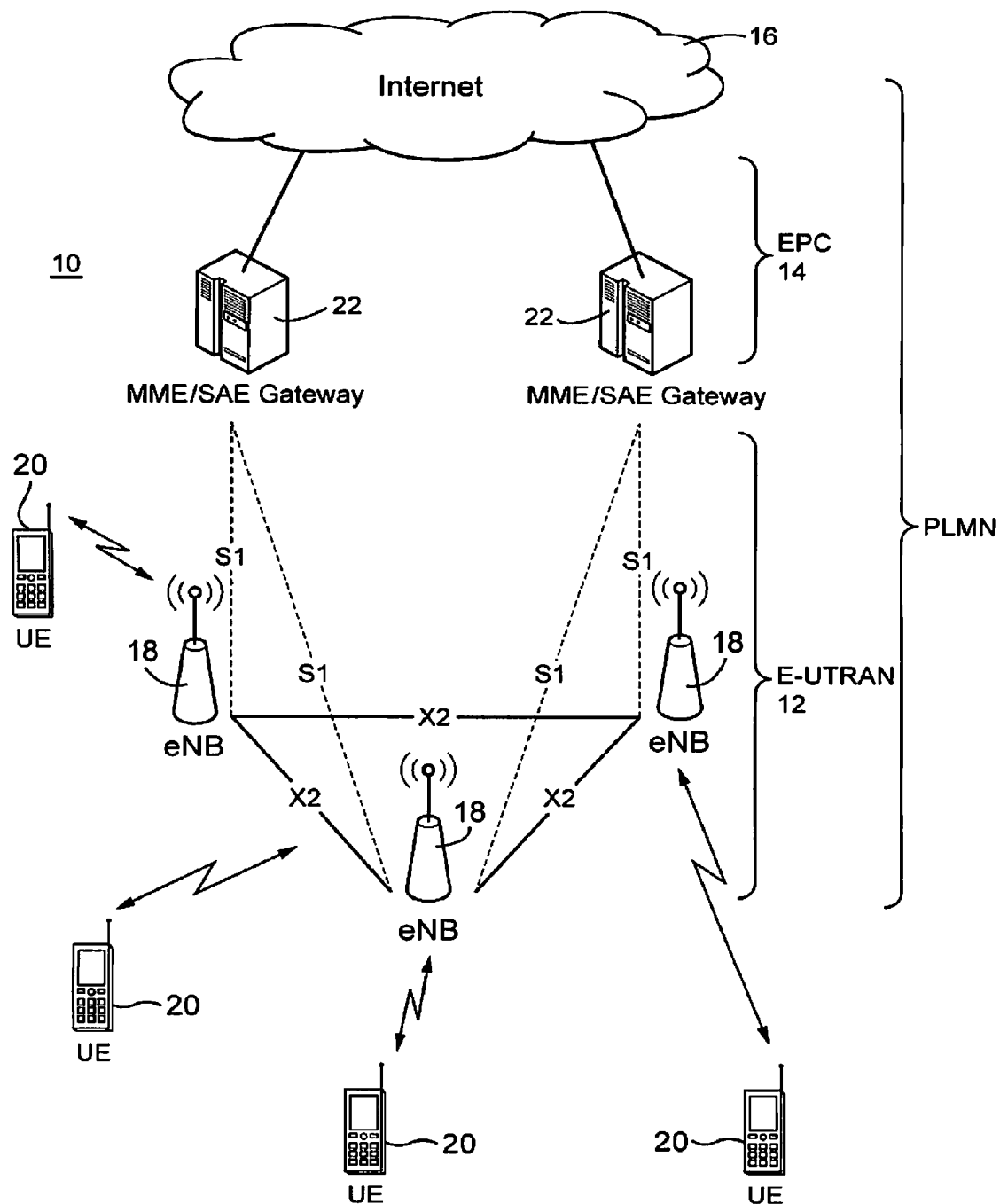
FIG. 1 is a function block diagram of an example LTE mobile radio communication system.
Figure 2:
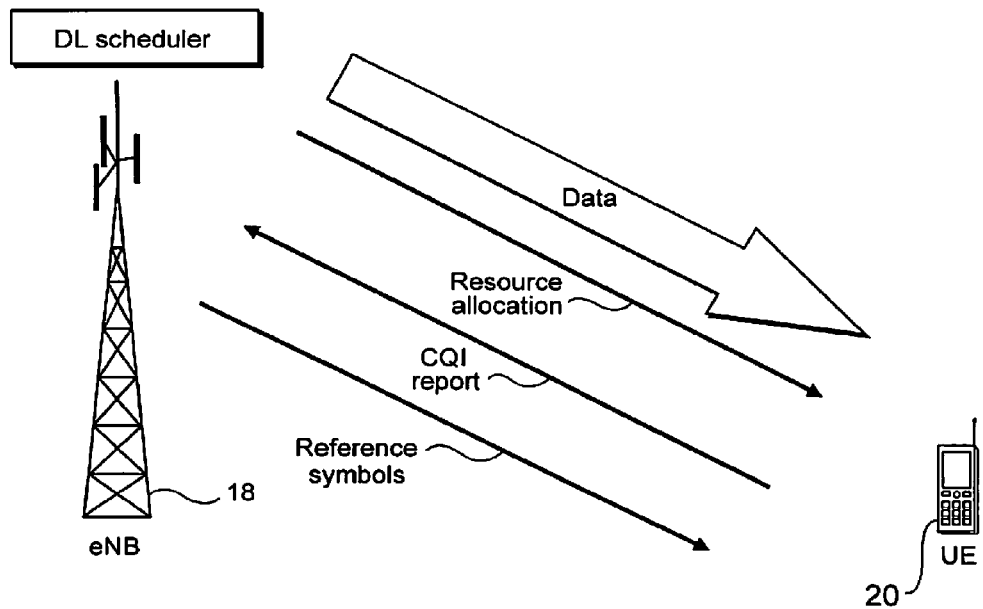
FIG. 2 is a conceptual illustration of downlink scheduling and related operations.
Figure 3:
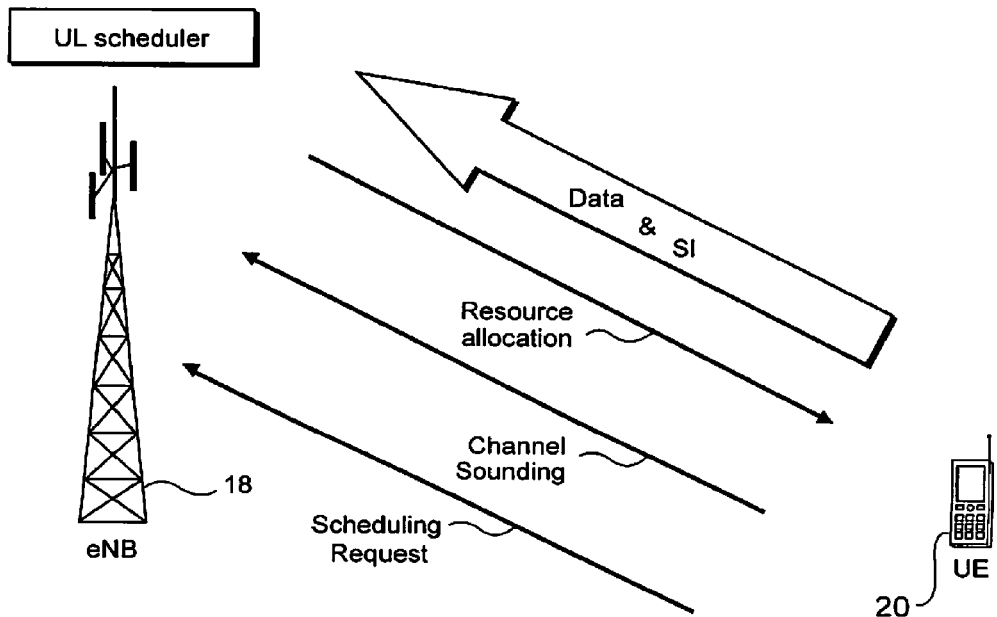
FIG. 3 is a conceptual illustration of uplink scheduling and related operations.

In the following description, for purposes of explanation and non-limitation, specific details are set forth, such as particular nodes, functional entities, techniques, protocols, standards, etc. in order to provide an understanding of the described technology. For example, much of the description below is provided in the context of an LTE application. But the technology described is not limited to LTE. In other instances, detailed descriptions of well-known methods, devices, techniques, etc. are omitted so as not to obscure the description with unnecessary detail.

It will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be embodied in computer readable medium and so executed by a computer or processor, whether or not such computer or processor is explicitly shown. The functions of the various elements including functional blocks may be provided through the use of dedicated electronic hardware as well as electronic circuitry capable of executing computer program instructions in association with appropriate software.

It will be apparent to one skilled in the art that other embodiments may be practiced apart from the specific details disclosed below. All statements reciting principles, aspects, and embodiments, as well as specific examples, are intended to encompass both structural and functional equivalents. Such equivalents include both currently known equivalents as well as equivalents developed in the future, i.e., any elements developed that perform the same function, regardless of structure.

As explained in the background, the HARQ operation in an LTE type system can be either asynchronous, where the HARQ process used for transmissions and retransmissions is explicitly signaled on a control channel, or synchronous, where the HARQ process is not explicitly signaled, but instead the HARQ process is tied to the timing of the transmission, e.g., to a system frame number. The benefit with a synchronous protocol is that out-of-band signaling is not needed to identify the HARQ process associated with a (re)transmitted data unit. This is particularly important in the uplink where it is costly in terms of power to achieve a high reliability on the control channel signaling.

The main mode of operation for the downlink scheduler is dynamic scheduling, where the base station transmits scheduling assignments to the UEs, based on current conditions, needs, and resources, to indicate which radio resources the UEs have been allocated for uplink transmission and downlink reception. A dynamically scheduled resource does not persist, i.e., does not remain allocated to a UE, after the scheduled transmission is over. The base station also indicates how a data transmission is to be coded and modulated in both uplink and downlink. For the downlink, where asynchronous HARQ is assumed for an example embodiment, the HARQ process identifier and redundancy version may be included on the control channel, e.g., the L12 control channel, together with the dynamic scheduling assignment.

In the downlink, because the HARQ protocol is asynchronous, a data unit retransmission may occur at any time after the NACK feedback has been received in the base station transmitter. Thus, there is a need to identify the HARQ process for which the transmission is made in order for the UE's HARQ receiver to correctly combine a transmission with the correct retransmission. This is done by indicating the HARQ process in the scheduling assignment on a control channel, like the PDCCH, both for the initial dynamically-scheduled transmission and subsequent dynamically-scheduled retransmissions.

A problem with semi-persistent scheduling is that there is no scheduling assignment before each transmission/retransmission that provides the HARQ process identity of the transmitted unit sent via the semi-persistent resource. But the HARQ receiver still must match dynamic retransmissions of a data unit, e.g., a MAC PDU, with the persistently scheduled first HARQ transmission of the same data unit.

For a semi-persistently allocated resource, the eNodeB does not send a dynamic assignment message, and thus, cannot request a particular HARQ process to be used for the initial transmission of a data unit. Therefore, the eNodeB randomly selects one of its idle HARQ processes and uses it to prepare and transmit a data unit using the semi-persistently assigned transmission resource. The UE also randomly selects an idle HARQ process and prepares to receive and decode data expected from the eNB. If the UE can decode the initial transmission from the eNodeB, then there is no problem. But if the UE must request a retransmission, then the eNodeB sends a dynamically scheduled downlink assignment indicating the resource, modulation scheme, transport format, and the HARQ process ID for the retransmission. When the UE receives this assignment, the indicated HARQ process ID very likely does not match the identifier of the randomly chosen process the UE used for initial reception.

In certain scenarios and under certain preconditions the UE could identify such a dynamic resource assignment and match it to the HARQ process used for reception of the semi-persistent allocation. However, (1) if multiple processes are used in parallel, (2) if the eNodeB does not schedule the retransmission after exactly one round trip time (RTT) period, or (3) if a previous dynamic resource assignment was lost, (these are three examples), the mapping is likely to be wrong, leading to a loss of the data unit.

Figure 7:
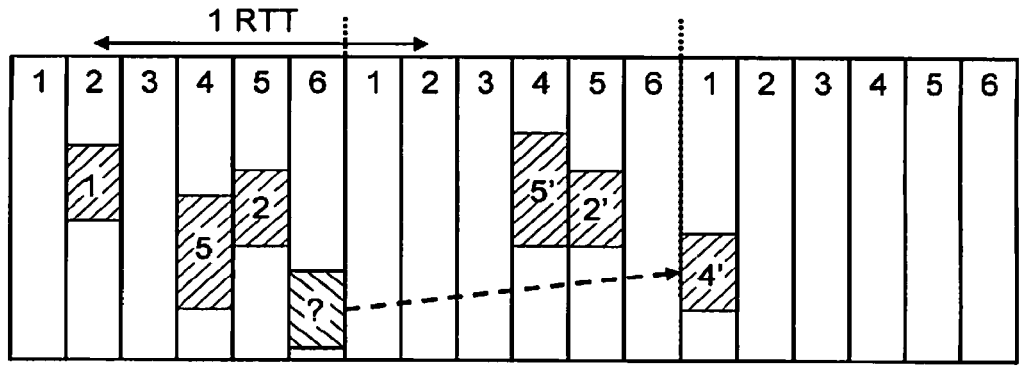
FIGS. 7 and 8 are timing diagrams illustrating the problem where the UE and eNB in some situations can end up using the same HARQ process.

FIG. 7 depicts an example of a problem where the UE and eNB in some situations can end up using the same HARQ process. In FIG. 7, there are six transmission time intervals (TTIs), and the repeat period for a TTI is indicated as 1 round trip time (RTT). The dashed boxes indicate transmissions, first transmissions in the HARQ processes 1, 5 and 2 are indicated by the numbers 1, 5, and 2 respectively. Retransmissions in the same processes are indicated by 1', 5', and 2'. Note that the transmitter in asynchronous HARQ is not restricted to using the HARQ process in any given order. The eNB makes a semi-persistent transmission during TTI 6 indicated by a question mark (?) because the HARQ process identity is not known by the UE. When the HARQ retransmission for this HARQ process (indicated by 4') is made, i.e. the UE received a scheduling assignment indicating a HARQ retransmission for HARQ process 4, the UE can conclude that this retransmission must belong to the transmission marked with the question mark since in this special case there is no other HARQ process outstanding. So it is possible for the UE to correctly combine a retransmission with a transmission done in a semi-persistent resource, but only if the HARQ processor in the UE keeps track of the all the HARQ process IDs being used. In the example in FIG. 7, because no other HARQ process has been negatively acknowledged by the UE, a dynamic downlink assignment indicating a retransmission for the process with HARQ process ID 4 must correspond to the expected retransmission of the data unit associated with the semi-persistent assignment.

Figure 8:
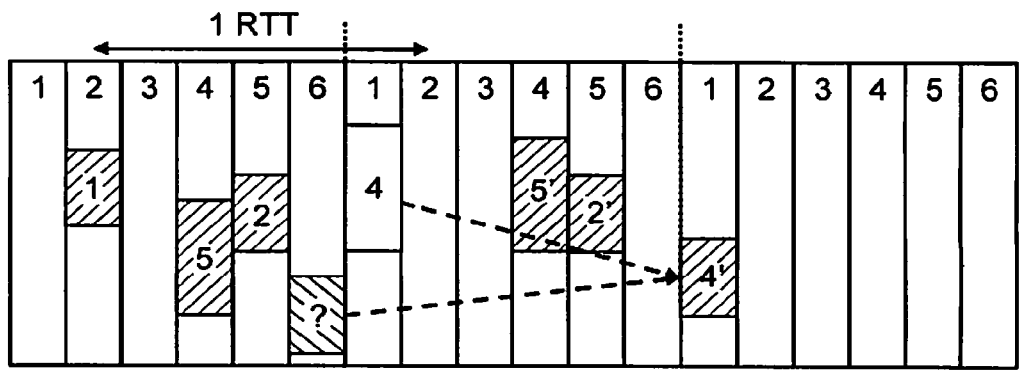

But in many cases it will not be possible for the UE to determine which HARQ process ID the eNB used for a transmission. FIG. 8 shows the case where the eNB intended to transmit dynamically scheduled data in HARQ process 4 (indicated by the number 4), but the scheduling assignment was not received by the UE. When the UE receives the scheduling assignment for the retransmission of HARQ process 4 (indicated by 4'), the UE tries to combine this retransmission with the semi-persistent transmission indicated by a question mark. The result is a combination of two different data units that ultimately results in excessive delay.

To overcome these difficulties, each semi-persistent resource allocation is associated with a particular HARQ process. The eNodeB includes an identifier of the associated HARQ process in a message it sends to the UE. For example, that message could be a configuration message, (e.g., a radio resource control (RRC) configuration message), that configures the semi-persistent allocation of transmission (or reception) radio resources. Alternatively, the association may be conveyed along with a scheduling assignment message or some other suitable message.

The HARQ receiver, e.g., the UE in the example where asynchronous HARQ is used in the downlink, stores that association. As a result, the HARQ receiver can determine if the HARQ process identifier for a dynamically scheduled HARQ retransmission corresponds to the HARQ process identifier for an initially transmitted data unit sent via a semi-persistent resource, i.e., sent without a resource scheduling assignment.

Figure 9:
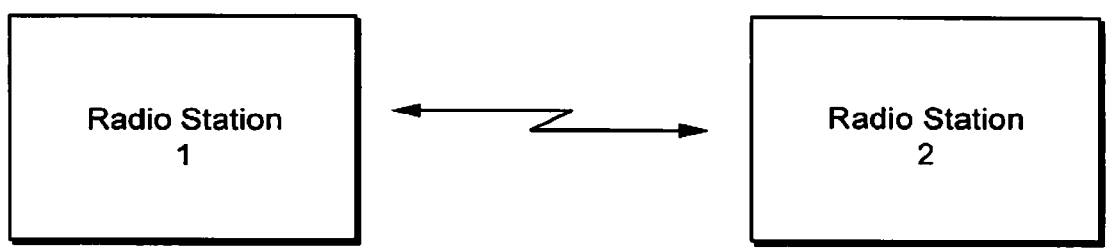
FIG. 9 is a diagram illustrating communication over a radio link between two radio stations.

FIG. 9 is a general diagram illustrating communication over a radio link between two radio stations 1 and 2. Although the technology described as particular application in cellular radio communications between a base station and a user equipment (UE), the technology also may be applied in any radio communication between radio stations that employ an ARQ-type protocol, semi-persistent resource allocation, and dynamically-scheduled retransmissions of data units.

Figure 10:
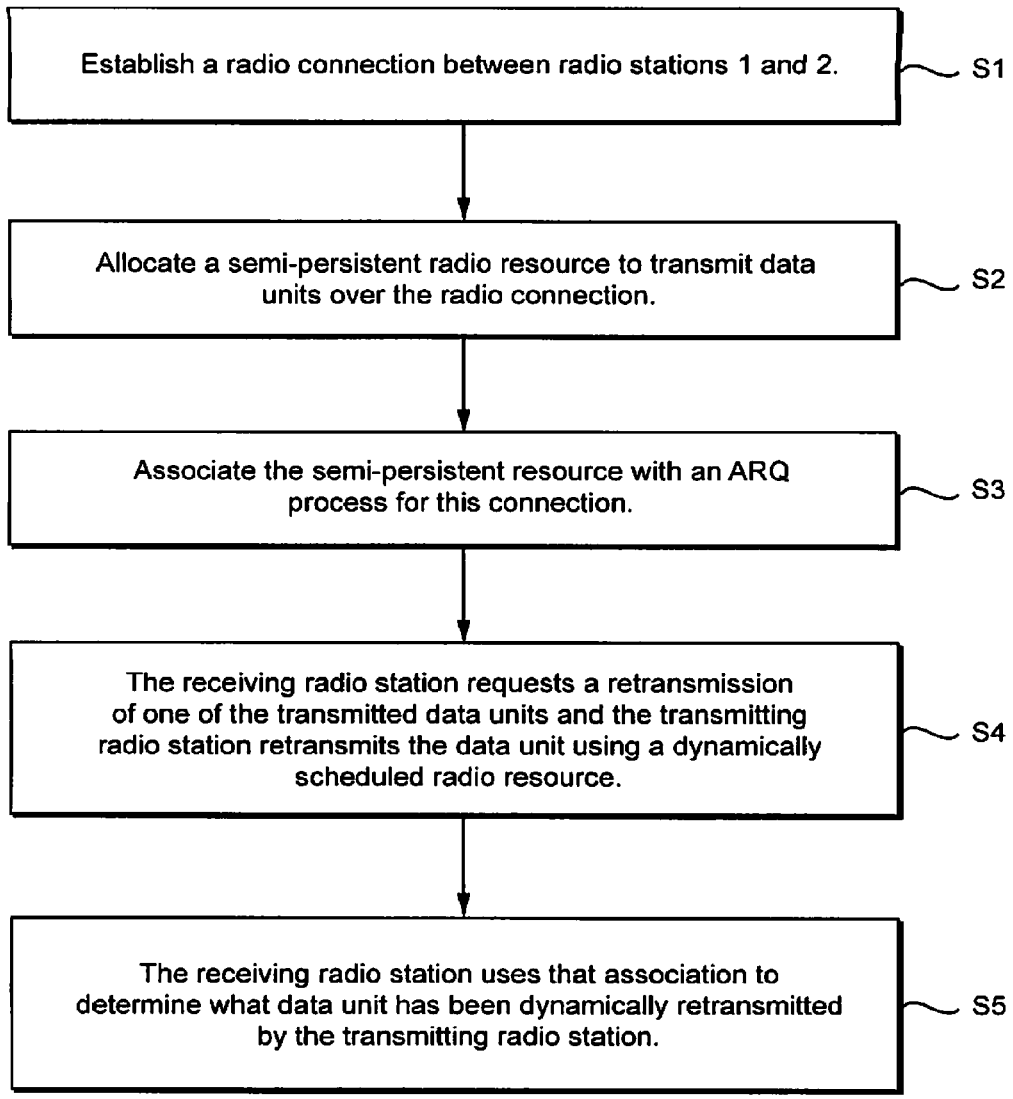
FIG. 10 is a flow chart diagram illustrating non-limiting, example procedures in which dynamically-scheduled retransmissions of data units that were initially transmitted using semi-persistent radio resources can be identified by the receiving radio station.

FIG. 10 is a flowchart diagram illustrating non-limiting example procedures in which dynamically-scheduled retransmissions of data units that were initially transmitted using semi-persistent radio resources can be identified by the receiving radio station. In step S1, a radio connection is established between two radio stations 1 and 2. A semi-persistent radio resource is allocated to transmit data units over the radio connection (step S2). The semi-persistent resource is associated with an ARQ process for this connection (step S3). If there is a need for more than one semi-persistent process for a radio connection, then the association can be established with multiple ARQ processes. The receiving radio station requests a retransmission of one of the transmitted data units, and the transmitting radio station retransmits the data unit using a dynamically scheduled radio resource (step S4). The receiving radio station uses that association previously established in step S3 to determine what data unit has been dynamically retransmitted by the transmitting radio station (step S5).

Figure 11:
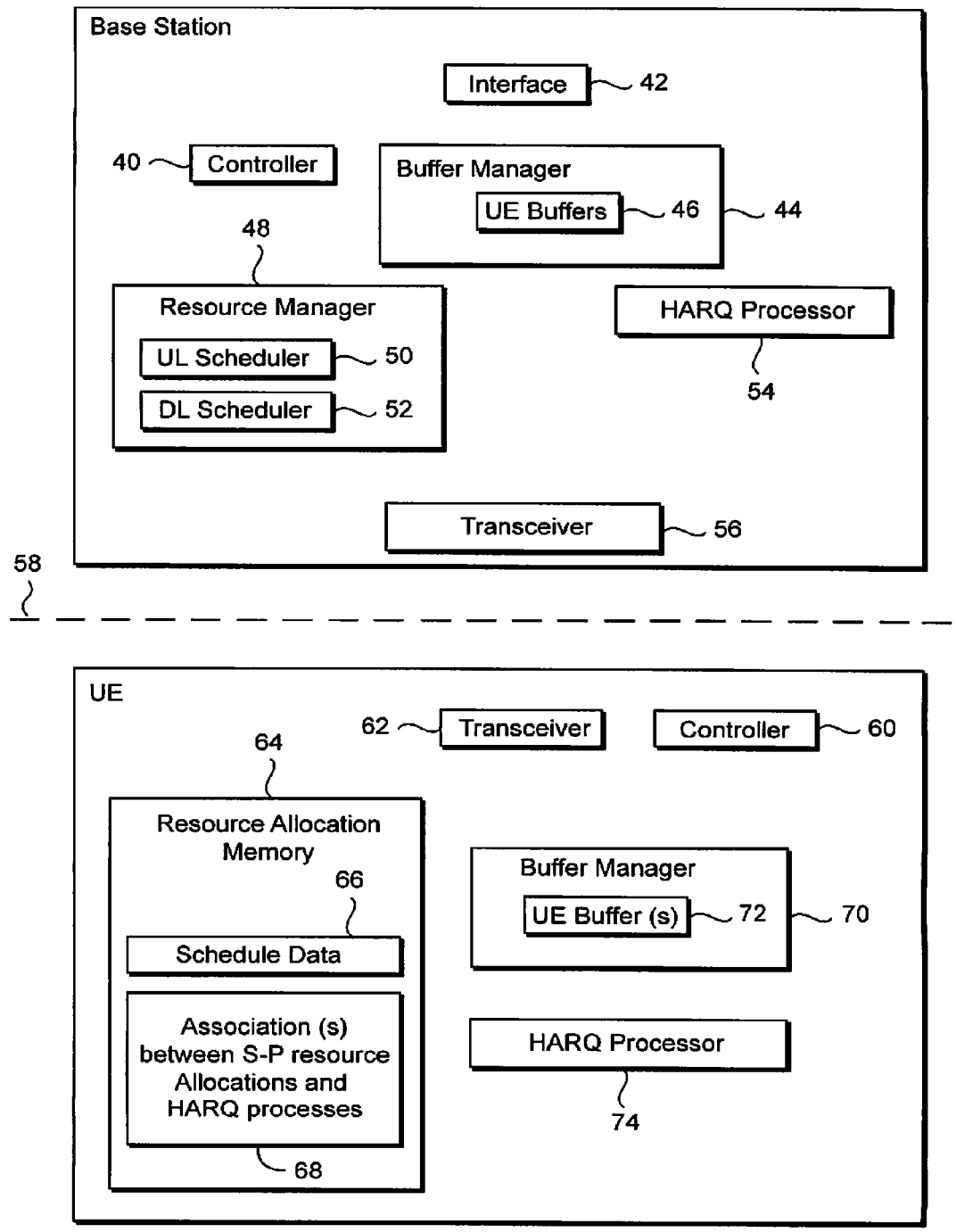
FIG. 11 is a non-limiting, example function block diagram of a base station and a UE employing procedures similar to those outlined in FIG. 11.

FIG. 11 is a non-limiting, example function block diagram of a base station and a UE employing procedures similar to those to outlined in FIG. 10. A base station communicates over a radio interface indicated at the dash line 58 with a UE. The base station includes a controller, and interface 42 for connection to one or more other nodes and/or networks, a buffer manager 44 including multiple UE buffers 46, a resource manager 48 including uplink scheduler 50 and downlink scheduler 52, an HARQ processor 54, and a transceiver 56. The controller 40 is responsible for the overall operation of the base station. Although the radio resources are described here in terms of TTIs, frames, sub-frames, or as time slots during which a data unit may be transmitted over the radio interface, it is to be understood that other types of radio resources may also be allocated including for example different frequencies and/or different orthogonal subcarriers as is the case in orthogonal frequency divisional multiplexing (OFDM).

Figure 4:
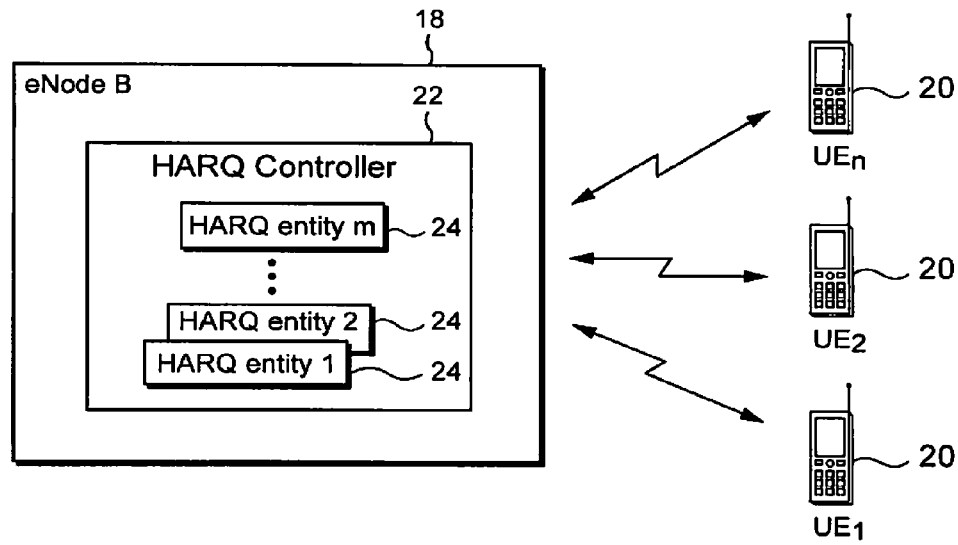
FIG. 4 is a function block diagram showing a non-limiting example of an HARQ controller in an eNB with multiple HARQ entities that correspond to multiple UEs.
Figure 5:
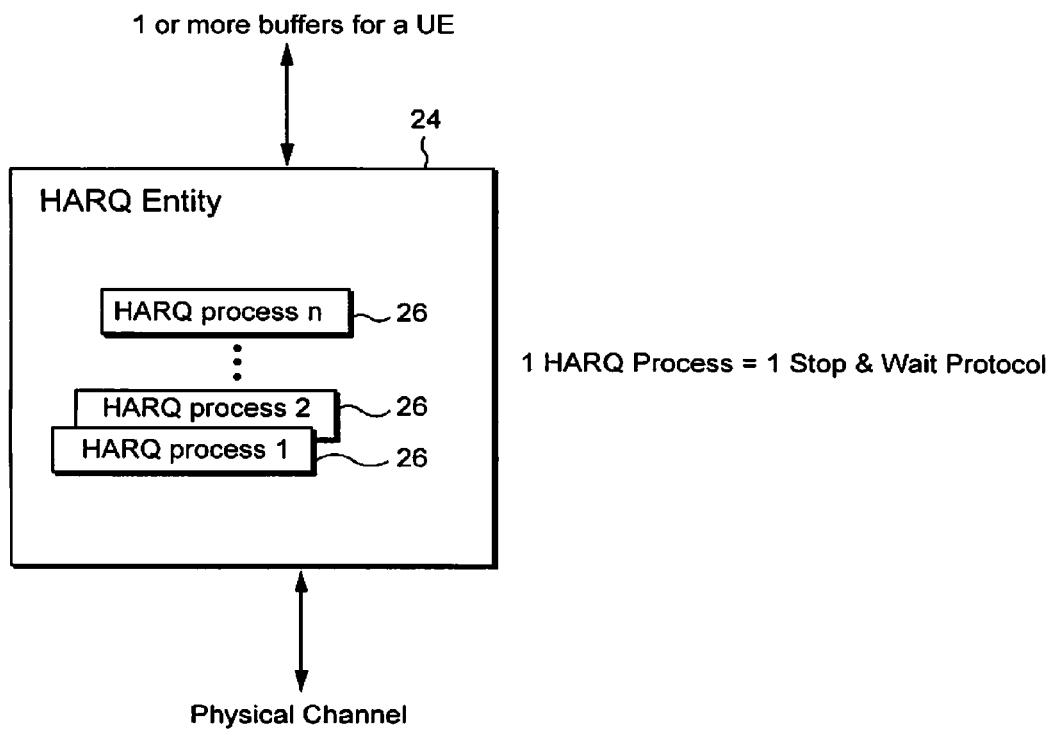
FIG. 5 is a function block diagram showing a non-limiting example of an HARQ entity with multiple HARQ processes.
Figure 6:
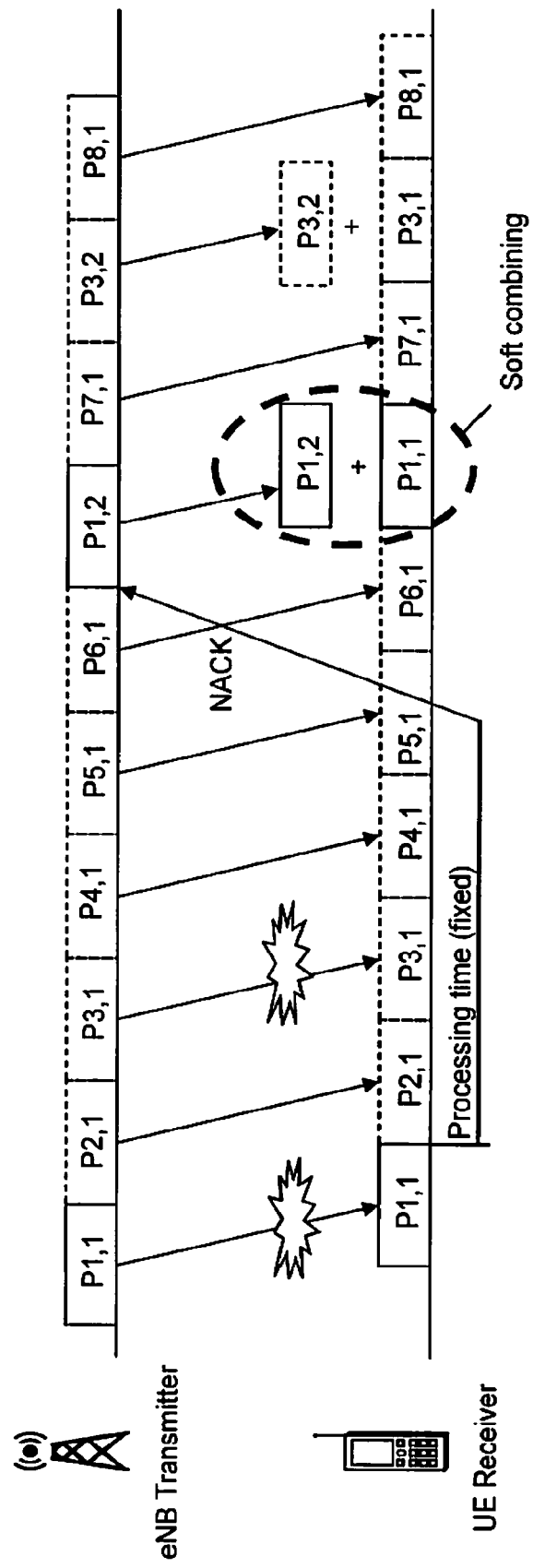
FIG. 6 shows a non-limiting example of multiple operating HARQ processes.

The buffer manager 44 includes logic for directing user data into and out of an appropriate queue or buffer 46. Each of the buffers 46 is associated with a respective radio connection to a UE and stores user data destined for transmission on the downlink over the air interface 56 to the respective UE. Data from the UE buffers is assembled into a transmission data unit and provided to the transceiver 56 for transmission using an appropriate radio resource to the appropriate UE. Those radio resources are managed by the radio resource manager 46. The transceiver 46 can comprise conventional elements such as suitable encoder(s), amplifier(s), antenna(s), filter(s), conversion circuitry, etc. The uplink scheduler 50 is responsible for providing dynamic radio resource grants to the various UEs that need to transmit data units in the uplink to the base station. The downlink scheduler 52 is responsible for scheduling dynamic radio resource assignments from the base station to the various UEs as well as establishing semi-persistent radio resource allocations where appropriate, e.g., to support services such as voice over IP that benefit from semi-persistent resource allocation. The HARQ processor 54 is responsible for managing HARQ processes and may include multiple HARQ entities such as those described in conjunction with FIGS. 4 and 5.

The UE at the bottom of FIG. 11 includes a supervisory controller 70, a radio transceiver 62, a resource allocation memory 64, a buffer manager 70 with one or more UE buffers, and a HARQ processor 74. The HARQ processor 74 manages the HARQ process(es) being employed by the UE. The UE buffer(s) 70 stores the data units that are to be transmitted via the transceiver 62 using an appropriately-allocated radio resource. The resource allocation memory allocation memory includes scheduling information 66 received from the uplink and downlink schedulers 50 and 52 from the base station. Resource allocation memory 64 also stores one or more associations between semi-persistent resource allocations and HARQ processes 68. The HARQ processor 74 uses these stored associations in order to match the HARQ process for a dynamically scheduled, retransmitted data unit with the HARQ process for a data unit that was initially transmitted using a semi-persistent radio resource. Once the HARQ processes are properly matched by the UE, the HARQ processor 74 may soft-combine different redundancy versions of the same data unit as part of decoding that data unit.

Figure 12:
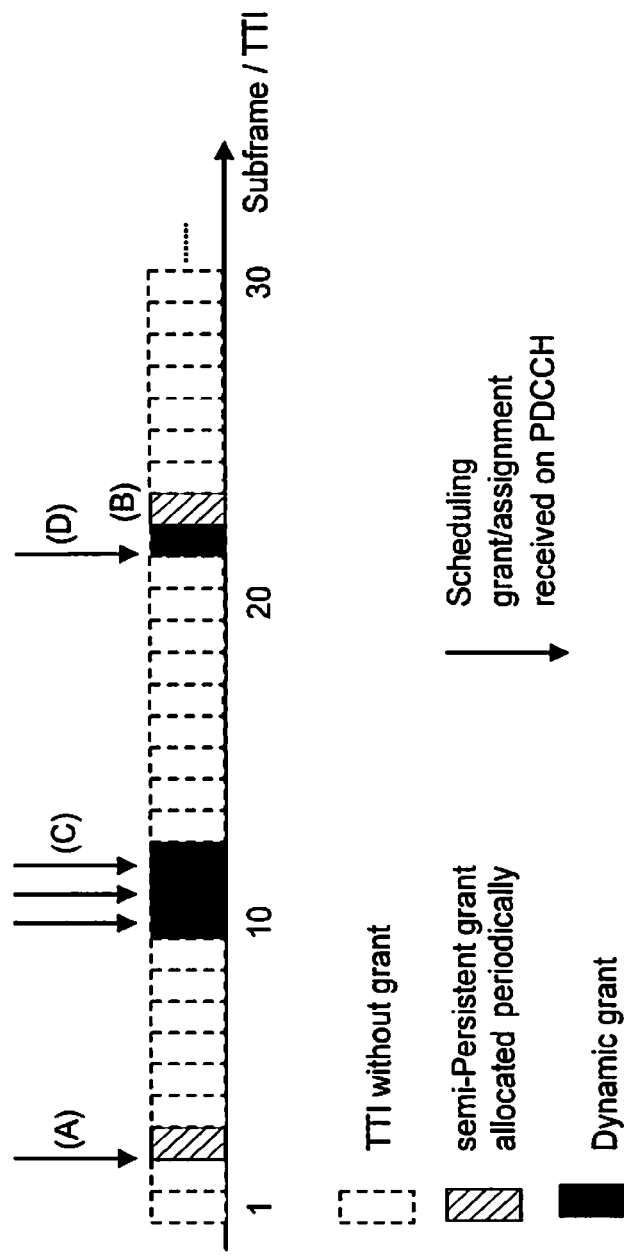
FIG. 12 is a non-limiting illustrative example.

FIG. 12 is an illustration to demonstrate one example of how this technology could work in practice. A semi-persistent assignment, shown as an arrow (A) pointing to a hatched lined block, is set for subframe or TTI 3 and repeats 20 TTIs later at TTI 23, wherein in this simple example, each TTI is assumed to be 1 msec. That semi-persistent scheduling assignment is configured via higher level signaling, e.g., an RCC reconfiguration message, with a certain period or cycle, which in the case of voice over IP (VoIP) might be a period of 20 msec. Thus, TTI 3, TTI 3+N (where in this non-limiting VoIP example, N equals 20 msec), TTI 3+2 N, TTI 3+3N, etc. are the semi-persistent assigned resources for a downlink UE transmission. The semi-persistent resource assignment may also be conveyed to the UE by a message sent over a control channel, e.g., the PDCCH, indicating that the assignment is semi-persistent. The control channel approach is assumed in this example. Once this semi-persistent assignment is received by the UE, the UE is scheduled one every 20 msec to receive a data unit from the base station until the semi-persistent assignment is revoked by the base station. As a result, no additional scheduling assignment is needed during a VoIP burst. Thus, there is no scheduling assignment message received on the PDCCH (indicated by an arrow pointing downwards in FIG. 13) for TTI 23, which is indicated at (B).

In conjunction with the semi-persistent resource assignments, the base station is also transmitting dynamic scheduling assignments. Dynamically scheduled assignments are shown in FIG. 12 at TTIs 10, 11, and 12 indicated by the three downward arrows labeled as (C) pointing to solid black blocks. In this simple example, each scheduling assignment schedules one data unit in an HARQ process that is identified in the dynamic scheduling assignment. The data unit transmissions in TTIs 10, 11, and 12 are allocated HARQ processes 1, 2, and 3, respectively.

Assume that the HARQ process 0 was associated with the semi-persistent assignment TTI 3 indicated at (A). That association is provided to the UE which stores the association between the semi-persistent resource TTI 3+N*20 ms, where N=0, 1, 2, . . . , and the HARQ process 0. The illustration in FIG. 13 assumes that the base station sends a VoIP data unit during the semi-persistent TTI 3 and that the UE does not receive it correctly. As a result, the UE sends a NACK back to the base station. After receiving that NACK, the base retransmits that same VoIP data unit during dynamically scheduled TTI 22 as indicated by the downward arrow at (D). Thereafter, the next VoIP packet is then transmitted in TTI 23 as indicated at (B).

Fortunately, the UE knows that the semi-persistent resource TTI 3 and the HARQ process 0 are associated because the UE stored that association information earlier. That way, when the UE receives the dynamically scheduled data unit at TTI 22 (indicated at (D)), along with the HARQ process 0 identifier, the UE knows that the data unit received is actually the retransmission of the HARQ process 0 data unit initially sent at TTI 3. Because of that association, the UE knows that the HARQ process 0 corresponds to the data unit sent during TTI 3.

In one non-limiting example embodiment, the allocation of HARQ process identifiers for the semi-persistent allocation can be restricted to process identifiers that are not used for dynamic scheduling of data. For example, if there are a total of HARQ processes, dynamic scheduling might use HARQ process identifiers 1 . . . 6 and the semi-persistent allocations can be made with HARQ process identifiers 7 and 8.

In summary, the technology described above allows asynchronous HARQ to be used in a reliable way for semi-persistent scheduling, increases the throughput, and minimizes the error cases for semi-persistent scheduling.

None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for communicating data units between radio stations over a radio interface, where a radio communications link is established between the radio stations and a semi-persistent radio resource is allocated to support data transmission over the communications link, the method comprising:

associating the semi-persistent radio resource with a corresponding automatic repeat request (ARQ) process identifier;

transmitting data units using the semi-persistent radio resource;

receiving a request for retransmission of one of the data units transmitted using the semi-persistent radio resource; and retransmitting the data unit using a dynamically scheduled radio resource that is different from the semi-persistent radio resource, and using the ARQ process identifier associated with the semi-persistent radio resource.

2. The method in claim 1, wherein the HARQ identifier identifies a HARQ process.

3. The method in claim 1, wherein the semi-persistent radio resource includes a transmission time interval, frame, subframe, or time slot during which to transmit a data unit over the radio interface.

4. The method in claim 1, further comprising associating the semi-persistent radio resource with multiple corresponding automatic repeat request (ARQ) process identifiers.

5. The method in claim 1, further comprising communicating the association between the semi-persistent radio resource and the one or more corresponding automatic repeat request (ARQ) process identifiers using a configuration message.

6. The method in claim 1, further comprising communicating the association between the semi-persistent radio resource and the one or more corresponding automatic repeat request (ARQ) process identifiers using a scheduling assignment message.

7. The method in claim 1, wherein the radio stations include a base station and a user equipment.

8. The method in claim 1, wherein the radio stations include a base station and a user equipment.

9. Base station equipment for communicating data units with a user equipment (UE) over a radio connection established between the base station and the UE, comprising:

a resource manager configured to allocate a semi-persistent radio resource for the radio connection;

transmitting circuitry for transmitting data units to the UE using the semi-persistent radio resource;

receiving circuitry configured to receive a request from the UE to retransmit one of the data units transmitted using the semi-persistent radio resource;

a processor configured to facilitate retransmission of the one data unit using a radio resource dynamically scheduled by the resource manager, the resource manager being configured to associate the semi-persistent radio resource with a corresponding hybrid automatic repeat request (HARQ) identifier.

10. The base station equipment of claim 9, further configured to provide the association between the semi-persistant radio resource and the HARQ identifier to the UE so as to permit the UE to use the HARQ identifier to determine an identity of retransmitted data unit.

11. The base station equipment in claim 9, wherein the HARQ identifier is a HARQ process.

12. The base station equipment in claim 11, wherein the semi-persistent radio resource includes a transmission time interval, frame, subframe, or time slot during which to transmit a data unit over the radio connection.

13. The base station equipment in claim 11, wherein the resource manager is configured to associate the semi-persistent radio resource with multiple corresponding HARQ processes.

14. The base station equipment in claim 11, wherein the transmitting circuitry is configured to transmit the association between the semi-persistent radio resource and the corresponding HARQ process using a configuration message.

15. The base station equipment in claim 11, wherein the transmitting circuitry is configured to transmit the association between the semi-persistent radio resource and the corresponding HARQ process using a scheduling assignment message.

16. A user equipment (UE) for communicating data units with a base station over a radio connection established between the UE and the base station, comprising:

receiving circuitry configured to receive from the base station information indicating that a semi-persistent radio resource is allocated to support data transmission from the base station over the radio connection, and thereafter, to receive data units transmitted using the semi-persistent radio resource;

transmitting circuitry configured to send a message to the base station requesting retransmission of a data unit that was previously transmitted using the semi-persistent radio resource; and processing circuitry configured to use the HARQ process associated with the semi-persistent resource to identify a received retransmission of a data unit dynamically scheduled on the radio connection with the requested data unit retransmission.

17. The UE of claim 16, the receiving circuitry being further configured to receive from the base station an association between the semi-persistent radio resource and a corresponding hybrid automatic repeat request (HARQ) process.

18. The UE in claim 17, wherein the receiving circuitry is configured to receive from the base station an association between the semi-persistent radio resource and multiple corresponding HARQ processes.

19. The UE in claim 16, wherein the semi-persistent radio resource includes a transmission time interval, frame, subframe, or time slot during which to transmit a data unit over the radio interface.

20. The UE in claim 16, wherein the receiving circuitry is configured to receive from the base station a scheduling assignment message that includes the association between the semi-persistent radio resource and the one or more corresponding HARQ processes.

21. The UE in claim 16, wherein the receiving circuitry is configured to receive from the base station a configuration message that includes the association between the semi-persistent radio resource and the one or more corresponding HARQ processes.

22. The UE in claim 16, further comprising memory for storing the association between the semi-persistent radio resource and one or more corresponding hybrid automatic repeat request (HARQ) processes.

23. A method for communicating data units between radio stations over a radio interface, where a radio communications link is established between the radio stations and a semi-persistent radio resource is allocated to support data transmission over the communications link, the method comprising:

associating the semi-persistent radio resource with a corresponding automatic repeat request (ARQ) process identifier;

requesting retransmission of a data unit transmitted using the semi-persistent radio resource, receiving a retransmission of the data unit on a dynamically scheduled radio resource that is different from the semi-persistent radio resource; and using the ARQ process identifier associated with the semi-persistent resource to match the retransmission of a data unit dynamically scheduled on the communications link with the requested data unit retransmission.

24. The method in claim 23, wherein the ARQ process identifier is a hybrid ARQ (HARQ) identifier and a retransmitted data unit is combined with a previously-received version of the data unit.

25. The method in claim 23, wherein the HARQ identifier identifies a HARQ process.

26. The method in claim 23, wherein the semi-persistent radio resource includes a transmission time interval, frame, subframe, or time slot during which to transmit a data unit over the radio interface.

27. The method in claim 23, further comprising associating the semi-persistent radio resource with multiple corresponding automatic repeat request (ARQ) process identifiers.

28. The method in claim 23, further comprising receiving the association between the semi-persistent radio resource and the one or more corresponding automatic repeat request (ARQ) process identifiers in a configuration message.

29. The method in claim 23, further comprising receiving the association between the semi-persistent radio resource and the one or more corresponding automatic repeat request (ARQ) process identifiers in a scheduling assignment message.

* * * * *

UNITED STATES PATENT AND TRADEMARK OFFICE
CERTIFICATE OF CORRECTION

PATENT NO. : 8,995,383 B2
APPLICATION NO. : 14/039061
DATED : March 31, 2015
INVENTOR(S) : Torsner et al.

It is certified that error appears in the above-identified patent and that said Letters Patent is hereby corrected as shown below:

On Page 2, in Item (56), under "OTHER PUBLICATIONS", in Column 1, Line 12, delete "Sevilla," and insert -- Seville, --, therefor.

In Column 1, Line 10, delete "2008," and insert -- 2008, now Pat. No. 8,594,029, --, therefor.

In Column 2, Line 28, delete "UE 18" and insert -- UE 20 --, therefor.

In Column 4, Line 8, delete "tehn" and insert -- then --, therefor.

In Column 9, Lines 9-10, delete "manager 46. The transceiver 46" and insert -- manager 48. The transceiver 56 --, therefor.

In Column 9, Line 25, delete "controller 70," and insert -- controller 60, --, therefor.

In Column 9, Line 29, delete "buffer(s) 70" and insert -- buffer(s) 72 --, therefor.

In Column 11, Line 58, in Claim 10, delete "semi-persistant" and insert -- semi-persistent --, therefor.

Signed and Sealed this
Fifth Day of April, 2016

Michelle K. Lee
*Director of the United States Patent and Trademark Office*